United States Patent [19]

Allen

[11] Patent Number: 5,724,026
[45] Date of Patent: Mar. 3, 1998

[54] MULTIPLE OUTPUT LEVEL POWER SUPPLY WITH OVERPOWER DETECTION CIRCUIT

[75] Inventor: Jonathan Michael Allen, Rochester, Minn.

[73] Assignee: International Business Machines Corporation, Armonk, N.Y.

[21] Appl. No.: 639,917

[22] Filed: Apr. 24, 1996

[51] Int. Cl.$^6$ .................................................. G08B 21/00
[52] U.S. Cl. ...................... 340/635; 340/636; 307/32; 364/483
[58] Field of Search ................ 323/267; 307/31–34, 307/82; 340/635, 636; 364/483, 482

[56] References Cited

U.S. PATENT DOCUMENTS

| | | | |
|---|---|---|---|
| 3,740,569 | 6/1973 | Carcia | 307/32 |
| 3,757,234 | 9/1973 | Ohlson | 328/142 |
| 4,218,718 | 8/1980 | Sun | 361/79 |
| 4,345,288 | 8/1982 | Kampf et al. | 361/31 |
| 4,535,378 | 8/1985 | Endo | 361/18 |
| 4,616,302 | 10/1986 | Mandelcorn | 363/50 |
| 4,684,886 | 8/1987 | Doyle | 324/132 |
| 4,979,066 | 12/1990 | Kawata et al. | 361/10 |
| 5,170,311 | 12/1992 | Zulaski et al. | 361/94 |
| 5,181,153 | 1/1993 | Nishimura | 360/132 |
| 5,332,993 | 7/1994 | Ninomiya | 340/635 |
| 5,437,040 | 7/1995 | Campbell et al. | 364/483 |

Primary Examiner—Thomas Mullen
Assistant Examiner—Timothy Edwards, Jr.
Attorney, Agent, or Firm—Felsman, Bradley, Gunter and Dillon

[57] ABSTRACT

A multiple output level power supply is provided having an overpower detection circuit. The power supply provides multiple DC voltage output levels. A differential amplifier coupled to each DC voltage output level of the power supply is then utilized to generate a signal which is representative of the power output at each of the multiple voltage levels. The output of each differential amplifier is then coupled to a summer which generates a signal representative of the total power output from the multiple outputs of the power supply. A comparison of the total power output signal and a reference signal selected to be representative of the maximum desired power output may then be utilized to efficiently provide an indication of an overpower condition within the power supply.

12 Claims, 3 Drawing Sheets

MULTIPLE OUTPUT LEVEL POWER SUPPLY WITH OVERPOWER DETECTION CIRCUIT

BACKGROUND OF THE INVENTION

1. Technical Field

The present invention relates in general to an improved DC power supply and in particular to an overpower detection circuit for utilization with a multiple DC output level power supply. Still more particularly, the present invention relates to an improved overpower detection circuit for utilization in a computer system power supply.

2. Description of the Related Art

Modern computer systems typically employ multiple subsystems for specialized activities within the computer system. Thus, for example, it is not unusual for a single data processing system power supply to be required to supply multiple diverse voltage levels of differing polarities. One way this may be accomplished is the utilization of a DC-to-DC regulator to change a high DC voltage to multiple lower voltages which are utilized by the various peripheral systems within a data processing system.

Of course, it is desirable to minimize the amount of space and electrical assets utilized within such a power supply and consequently, the power handling capability of such a system must be carefully determined. This is accomplished in known power supply systems by determining at what levels of current an overload condition occurs, such that wiring and/or components within the system may be damaged.

Numerous power supplies have been proposed which include an over-current trip circuit or protective apparatus such that current through the power supply which exceeds a predetermined limit for a selected period of time will result in a fault condition which may initiate temporary shut down of the power supply.

While such protection systems can accommodate most power supplies, the multiplicity of voltage level outputs present within a state-of-the-art power supply within a computer system creates a situation in which the power supply can easily accommodate excessive current within one voltage output level, if the remaining output currents are below nominal levels.

Consequently, a need has been recognized for a multiple output level power supply which includes an overpower detection circuit which can identify a state of operation in which the total power within the power supply exceeds the rated level.

SUMMARY OF THE INVENTION

It is therefore one object of the present invention to provide an improved DC power supply.

It is another object of the present invention to provide an overpower detection circuit for utilization with a multiple DC output level power supply.

It is yet another object of the present invention to provide an improved overpower detection circuit for utilization with a multiple output level computer system power supply.

The foregoing objects are achieved as is now described. A multiple output level power supply is provided having an overpower detection circuit. The power supply provides multiple DC voltage output levels. A differential amplifier coupled to each DC voltage output level of the power supply is then utilized to generate a signal which is representative of the power output at each of the multiple voltage levels. The output of each differential amplifier is then coupled to a summer which generates a signal representative of the total power output from the multiple outputs of the power supply. A comparison of the total power output signal and a reference signal selected to be representative of the maximum desired power output may then be utilized to efficiently provide an indication of an overpower condition within the power supply.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
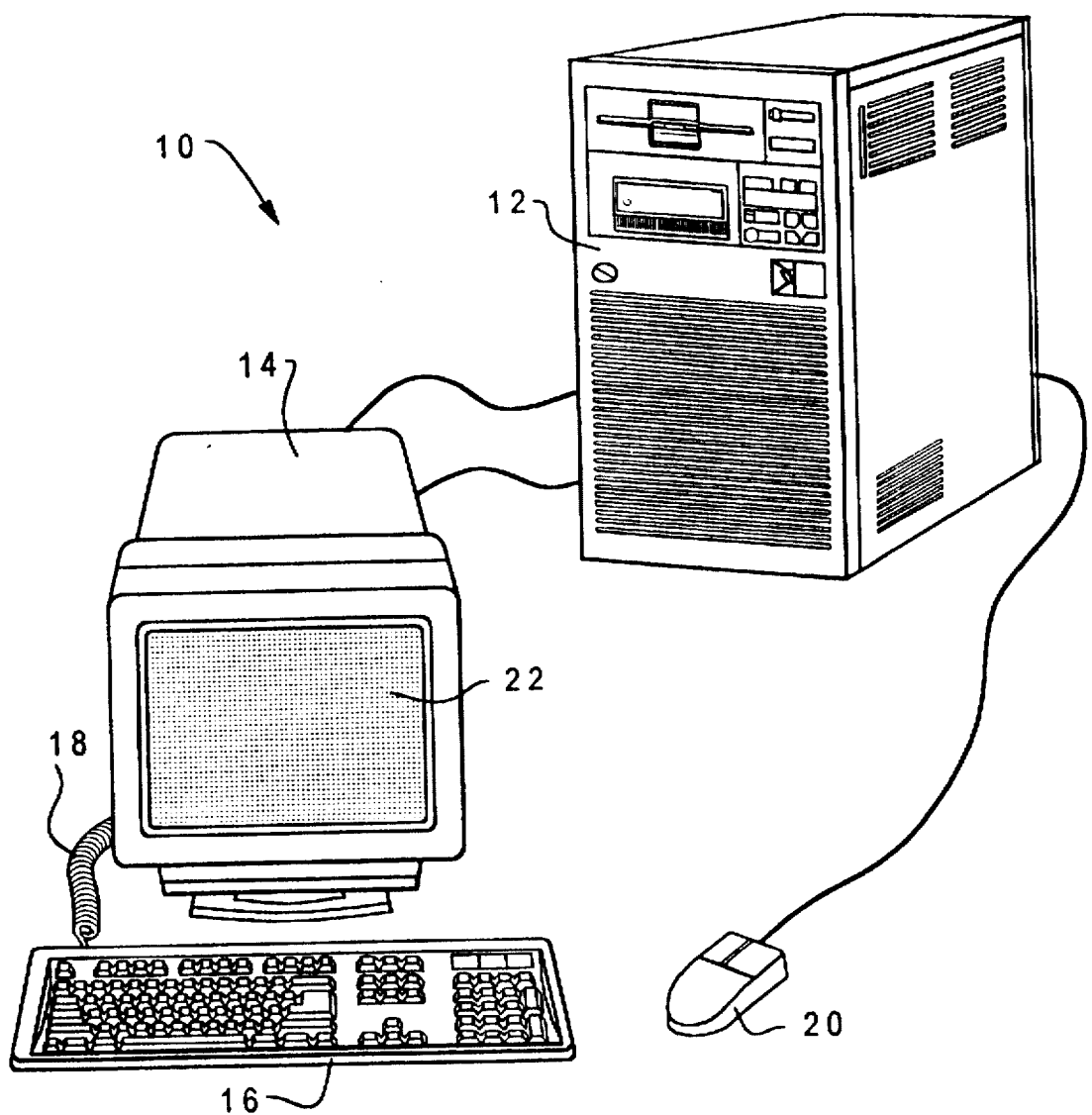
FIG. 1 depicts a pictorial representation of a data processing system which may be implemented utilizing the novel power supply of the present invention.

With reference now to the figures and in particular with reference to FIG. 1, there is depicted a pictorial representation of a data processing system which may be implemented utilizing the novel power supply of the present invention. As is illustrated, data processing system 10 preferably includes a processor module 12 and a display 14. Keyboard 16 is coupled to processor module 12 by means of cable 18 in a manner well known in the art. Also coupled to processor module 12 is mouse 20.

As depicted, display 14 includes a display screen 22. Those skilled in the art will appreciate that data processing system 10 may be implemented utilizing an enhanced mid-range computer, or a so-called "personal" computer. However, the depicted embodiment utilizes an enhanced mid-range computer sold under the trademark "AS/400" by International Business Machines Corporation of Armonk, N.Y.

As those skilled in the art will appreciate, data processing system 10 typically includes a DC power supply which provides, utilizing a DC-to-DC voltage regulator, multiple levels of DC voltage of both polarities, to operate subsystem components within data processing system 10. Examples of such subsystem components may include a processor board, a memory subsystem or a Direct Access Storage Device (DASD).

Figure 2:
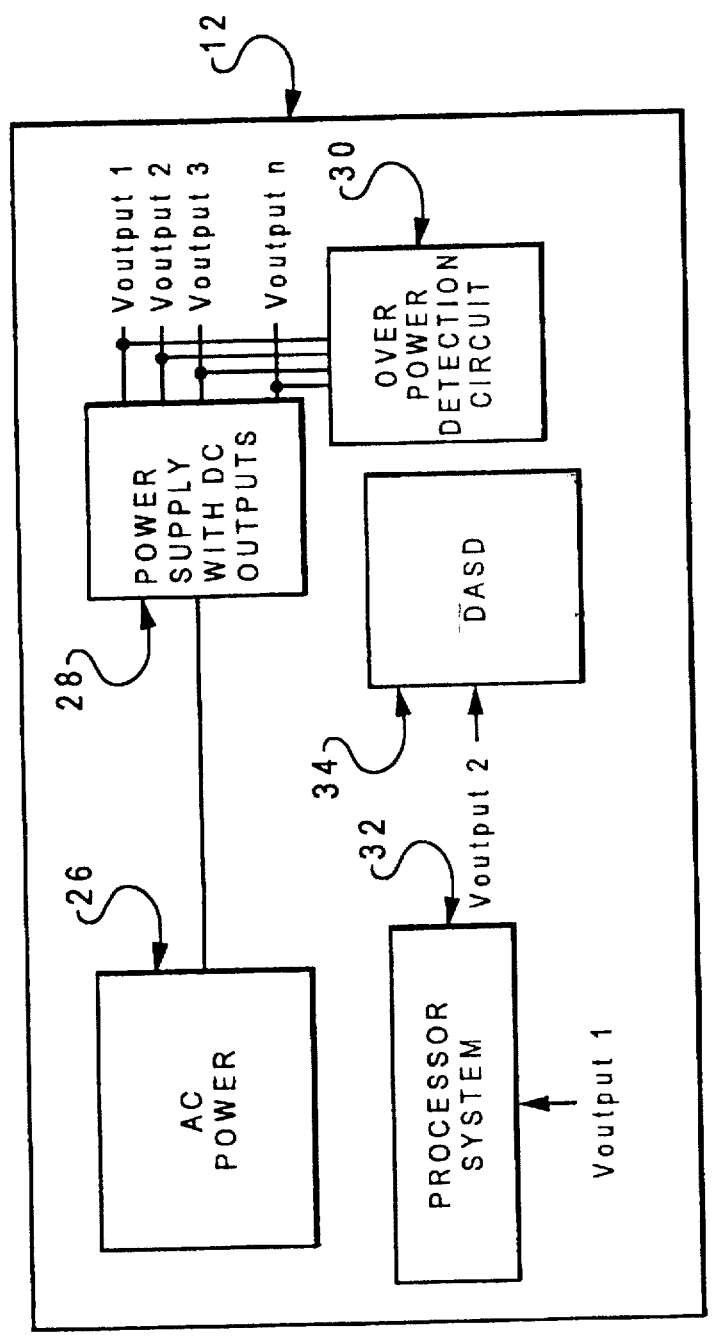
FIG. 2 is a high level block diagram of the processor module of the data processing system of FIG. 1.

Referring now to FIG. 2 there is depicted a high level block diagram of the processor module 12 of the data processing system 10 of FIG. 1. As depicted, processor module 10 includes a source of AC power 26 which is provided utilizing existing AC power distribution systems. A DC power supply 28 is coupled to AC power source 26 and is utilized, in a manner well known in the art, to provide multiple output voltage levels which are depicted within FIG. 2 as "Voutput 1" through "Voutput n." Each of these output voltages is then coupled to overpower detection circuit 30 and multiple output voltages are then provided for utilization by the subsystem components within processor module 12.

As examples, processor subsystem 32 and Direct Access Storage Device (DASD) 34 are both depicted each illustrating the utilization of a different DC voltage level supply. Of course, as those skilled in the art will appreciate, it is not uncommon for such subsystem components to utilize multiple voltage levels of diverse polarity.

Figure 3:
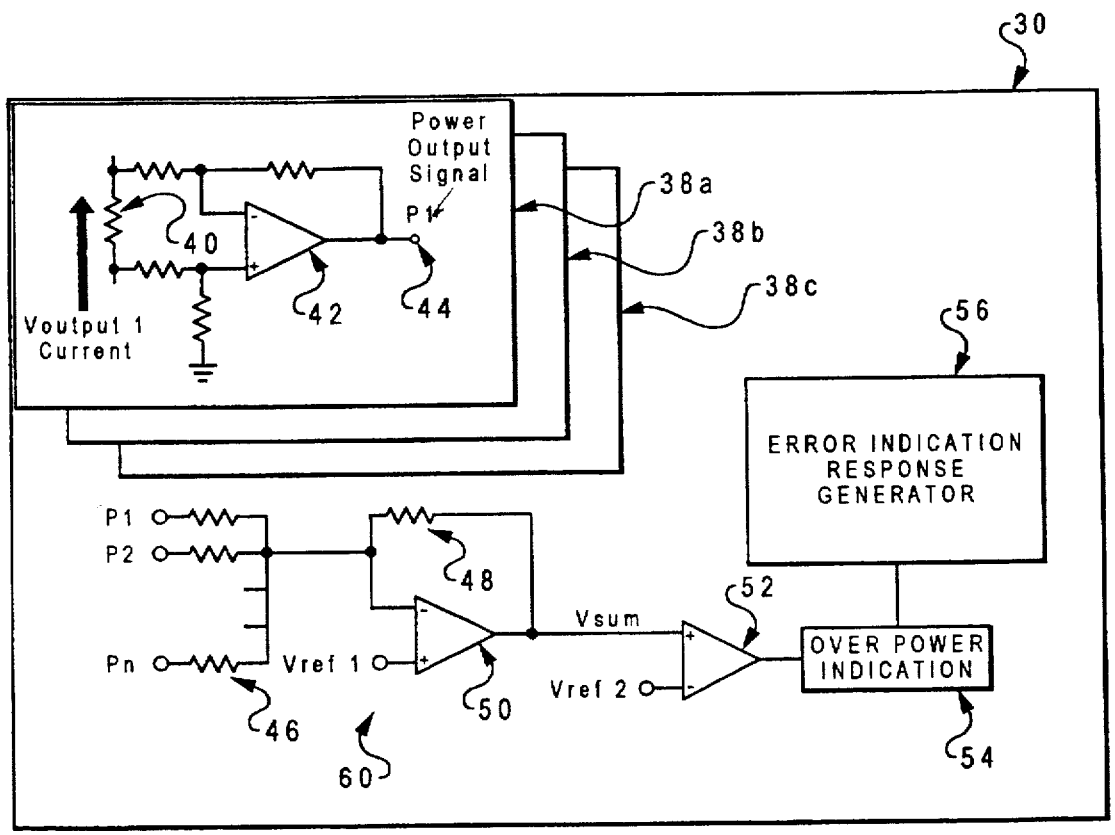
FIG. 3 is a partially schematic high level block diagram of the overpower detection circuit of the present invention.

With reference now to FIG. 3 there is depicted a partially schematic high level block diagram of the overpower detection circuit 30 of the present invention. As illustrated, multiple power indication circuits 38a, 38b, and 38c are illustrated. Of course, in a power supply in which a greater or lesser number of output voltage levels are present a greater or lesser number of power indication circuits may be utilized.

Power indication circuit 38a is illustrated in greater detail and, comprises a differential amplifier 42 which is utilized to create a signal P1 which is representative of the power output by the novel power supply of the present invention of a single voltage output level (Voutput 1). This is accomplished by passing the output current at that voltage level through a current sense resistor 40. The voltage then present on current sense resistor 40 may be coupled to the input of differential amplifier 42 and utilized to generate the power output signal P1.

This power output signal which is representative of the power output from the power supply at a particular voltage level can be determined by recognizing that the power output by the power supply at a particular voltage level can be expressed as the product of that voltage level and the current which passes through current sense resistor 40. For a differential amplifier having a specified gain, the signal P1 representative of the power output is simply the product of the current output at that voltage level, the resistance of current sense resistor 40 and the gain of differential amplifier 42. Since the resistance of the current sense resistor 40, the gain of differential amplifier 42 and the voltage output at a particular level are constants, the relationship between the power output signal P1 and the power output at that voltage output level are related by a constant which is easily identifiable. Of course, circuit components should be chosen to ensure that the power output signals can be driven adequately low by each differential amplifier 42.

Thus, as illustrated, Voutput 1 current is equal to the power output from the power supply at that voltage level divided by the Voutput 1 voltage level. The power output signal P1 is then equal to the product of the power output from the power supply at that voltage level, the resistance of current sense resistor 40 and the gain of differential amplifier 42 divided by the Voutput 1 voltage level. In this manner, since the resistance of current sense resistor 40, the gain of differential amplifier 42 and Voutput 1 are constant, these factors may be replaced by a constant and thus, power output signal P1 is seen to be directly related to the power output from the power supply at that voltage level by an easily determined constant.

In this manner, as depicted in FIG. 3 at reference numerals 38a and 38b and 38c, a power indication circuit may be provided for each of multiple diverse DC voltage levels and a signal indicative of the power output by the power supply at each of those voltage levels may be determined.

Next, still referring to FIG. 3, the sum of the power output by the power supply may be determined by coupling the power output signal generated by each of the power indication circuits described above to the input of a summer circuit. Thus, power output signal "P1" is representative of the power output level of the power supply at the "Voutput 1" voltage level, power output signal "P2" is representative of the power output from the power supply at the "Voutput 2" voltage level and power output signal "Pn" is representative of the power output from the power supply at the "Voutput n" voltage level. Of course, the constant by which each power output signal is related to the power output from the power supply at each particular voltage level can be utilized to equally weight the inputs to the summer circuit by varying the value of each resistor 46 utilized by the summer circuit. Since each constant can be easily calculated for each power output signal, choosing an appropriate resistors 46 for the summer circuit is a trivial matter.

Next, still referring to FIG. 3, all of the power output signals are applied thru resistors 46 to the negative terminal of op-amplifier 50 and a reference voltage "Vref 1" is applied to the positive terminal. Voltage level "Vref 1" needs to be set higher than any maximum power output signal from the power supply. The output of op-amplifier 50, "Vsum" is then representative of the total power output from the output voltage levels. This voltage is applied to the positive terminal of comparator and a second reference voltage "Vref 2" is applied to the negative terminal. Reference voltage "Vref 2" is chosen as the voltage representation of the maximum total power output from the power supply, and needs to be set higher than "Vref1". Thus, each time voltage level "Vsum" becomes lower than voltage level "Vref 2" an overpower indication is created at reference numeral 54, the output of the comparator.

The proper value for feedback resistor 48 for op-amplifier 50 can be simply calculated by knowing that an overpower condition will exist when the sum of the power output signals "P1-Pn" is equal to the maximum desired total power output value. Thus, the value for resistor 48 can be chosen such that the sum of all power signals is equal to the maximum desired total power desired when "Vsum" is equal to "Vref 2."

Next, overpower indication 54 may be utilized to generate an error indication signal. The error indication signal may then be coupled to error indication response generator 56. Error indication signal generator 56 can initiate any one of several desired responses to an overpower condition. For example, when the maximum desired power output from the power supply is reached or exceeded a fan associated with the power supply may be increased in speed, increasing the cooling airflow across the power supply. Similarly, power supply 28 may be temporarily shut down or the output configuration of data processing system 10 may be altered to eliminate selected power loads.

Upon reference those skilled in the art should appreciate that the novel power supply of the present invention utilizes an overpower detection circuit which determines a power output signal representative of the power output from a power supply for each of a plurality of diverse DC voltage levels and that these power output signals are then summed, utilizing the novel circuitry depicted within FIG. 3, to generate an overpower indication anytime the total power output from the multiple output voltages of the power supply exceeds a predetermined sum. In this manner, a more accurate representation of the condition of the power supply may be obtained than could otherwise be obtained utilizing only total power supply input current.

While the invention has been particularly shown and described with reference to a preferred embodiment, it will be understood by those skilled in the art that various changes in form and detail may be made therein without departing from the spirit and scope of the invention.

I claim:

1. An improved power supply comprising:
   a DC power supply for providing a plurality of diverse DC voltage output levels;
   a power indication circuit coupled to said DC power supply for generating a plurality of power output signals, each of said plurality of power output signals representative of the power output at one of said plurality of diverse DC voltage output levels; and
   a summation circuit coupled to said power indication circuit for generating a total power output signal representative of the total power output from selected ones of said plurality of diverse DC voltage output levels of said DC power supply wherein overpower condition may be detected.

2. The improved power supply according to claim 1, further including a plurality of current sense resistors each coupled to said DC power supply at one of said plurality of diverse DC voltage output levels.

3. The improved power supply according to claim 2, wherein said power indication circuit comprises a plurality of differential amplifiers each coupled to one of said plurality of current sense resistors.

4. The improved power supply according to claim 1, wherein said summation circuit further includes a maximum total power output reference signal.

5. The improved power supply according to claim 4, wherein said summation circuit further includes a comparator circuit for comparing said total power output signal with said maximum total power output reference signal.

6. The improved power supply according to claim 5, further including an error indication signal generation circuit coupled to said comparator circuit for generating an error indication signal in response to said total power output signal exceeding said maximum total power output reference signal.

7. An improved computer system power supply comprising:
   a DC power supply for providing a plurality of diverse DC voltage output levels;
   a plurality of computer subsystem components, each of said plurality of computer subsystem components requiring at least one of a plurality of diverse DC voltage output levels;
   a power indication circuit coupled to said DC power supply for generating a plurality of power output signals, each of said plurality of power output signals representative of the power output at one of said plurality of diverse DC voltage output levels; and
   a summation circuit coupled to said power indication circuit for generating a total power output signal representative of the total power output from selected ones of said plurality of diverse DC voltage output levels of said DC power supply wherein overpower condition may be detected.

8. The improved power supply according to claim 7, further including a plurality of current sense resistors each coupled to said DC power supply at one of said plurality of diverse DC voltage output levels.

9. The improved power supply according to claim 8, wherein said power indication circuit comprises a plurality of differential amplifiers each coupled to one of said plurality of current sense resistors.

10. The improved power supply according to claim 7, wherein said summation circuit further includes a maximum total power output reference signal.

11. The improved power supply according to claim 10, wherein said summation circuit further includes a comparator circuit for comparing said total power output signal with said maximum total power output reference signal.

12. The improved power supply according to claim 11, further including an error indication signal generation circuit coupled to said comparator circuit for generating an error indication signal in response to said total power output signal exceeding said maximum total power output reference signal.

* * * * *